United States Patent [19]

Geimer et al.

[11] 4,061,813

[45] Dec. 6, 1977

[54] COMBINATION SHEATHING SUPPORT - MEMBER BUILDING PRODUCT

[75] Inventors: Robert L. Geimer, Verona; William F. Lehmann, Madison, both of Wis.

[73] Assignee: The United States of America as represented by the Secretary of Agriculture, Washington, D.C.

[21] Appl. No.: 695,623

[22] Filed: June 14, 1976

Related U.S. Application Data

[63] Continuation-in-part of Ser. No. 478,284, June 11, 1974, abandoned.

[51] Int. Cl.[2] .......................... B32B 3/00; B32B 5/16

[52] U.S. Cl. .......................... 428/183; 52/309.13; 52/518; 52/309.16; 156/62.2; 264/119; 428/182; 428/326; 428/174; 428/192

[58] Field of Search .............. 428/174, 182, 156, 167, 428/332, 326, 192, 183; 264/109, 119; 156/62.2; 52/319, 309, 518, 553, 629, 738, 630, 450, 451, 625

[56] References Cited

U.S. PATENT DOCUMENTS

| | | | |
|---|---|---|---|
| 2,070,401 | 2/1937 | Greider et al. | 428/332 |
| 3,120,466 | 2/1964 | Bojanowski et al. | 264/119 |
| 3,166,617 | 1/1965 | Munk | 264/109 |
| 3,490,929 | 1/1970 | Schiff | 161/162 |

*Primary Examiner*—George F. Lesmes
*Assistant Examiner*—P. Thibodeau
*Attorney, Agent, or Firm*—M. Howard Silverstein; David G. McConnell

[57] ABSTRACT

A wood-base building component of cellulosic particles and/or fibers and adhesive binder is, in a single pressing operation, molded into an integral product of sheathing and support members for use in constructing wood-frame buildings. The dies utilized during press-molding form a flat panel containing a plurality of evenly spaced channels that serve as support members to replace conventional framing such as studs, joists, and rafters. The integral product may serve as roof, wall, or flooring components in the usual wood-frame building applications.

4 Claims, 5 Drawing Figures

COMBINATION SHEATHING SUPPORT - MEMBER BUILDING PRODUCT

This is a continuation-in-part application of my impending Ser. No. 478,284 filed on June 11, 1974, and now abandoned.

BACKGROUND OF THE INVENTION

1. Field of the Invention

The invention relates to the particleboard art generally with particular reference to a product that is pressed and molded in a single operation to form a panel-like building component containing integral support members.

(2) Description of Prior Art

In conventional wood-frame building construction, framing members (studs, joists, or rafters), are covered with lumber, or wide flat panels, to form walls, roofs, and floors. For example, sheathing, often in the form of plywood panels is applied to the exterior surface of the vertical framing support members, or studs, in conventional wall construction. Currently, such sheathing and studding are distinct, separable components.

At a time when factory production line techniques for producing house components are becoming a reality, and lumber quantity and quality are declining, a more economical product, which incorporates the desirable characteristics of both sheathing and framing members, is highly desirable. The invention incorporates these characteristics. In addition, lower grade or previously unusable wood in the form of forest residues can be used in producing the invention as opposed to the higher grade of wood used to make the separate plywood and framing members of conventional frame construction.

The process used to manufacture the product essentially follows the flat-pressed particleboard process with the exception that caul plates and platens having the desired shape are used. Forming the shape, which incorporates walls at steep angles to the horizontal plane, does not necessarily depend on the material "flow" essential to closed mold operations, but is dependent on the interaction between material type, initial mat formation, and proper die configuration to hold, shape, and form the product. German Patent No. 2,035,953 describes methods of producing articles with steep sidewalls such as are essential to form the framing portion of our product.

The inventors are unaware of any press-molded cellulosic replacement for conventional roof, wall, or floor components which incorporates both framing and sheathing members into one integral unit.

SUMMARY OF THE INVENTION

The invention disclosed is a building component of cellulosic particles and adhesive binder that is press-molded in a single operation to form a panel with integral support or framing members. The particleboardlike product may be formed in standard press equipment except that the press must be modified by the substitution of dies for regular flat platens. As will be disclosed, the cellulosic particles and adhesive binder are felted into a mat on a caul plate having a shape similar to the lower die or platen. The mat and caul plate are then inserted between the heated upper and lower shaped platens whereupon the press is closed and the mat is pressed and molded to the predetermined configuration.

The lower die basically has a flat horizontal surface indented with a plurality of parallel troughlike depressions running its length. Each depression generally has steeply inclined sidewalls and a more or less flat bottom. The sidewalls themselves may be grooved (i.e., having a series of steps running the length of the die) or smooth. The depth and width of the depressions, angle of sidewall inclination, and the surface configuration of sidewalls is determined by the exact requirements of the desired product and type of material to be pressed.

The upper platen serves as the male portion of the die and has the same general configuration, in reverse, as the lower portion, i.e., a basically flat surface with a plurality of parallel ridgelike projections corresponding to the depressions mentioned. These projections in the upper die are not necessarily, and most unlikely to be, exact reverse images of the depressions in the lower die. The projections may be grooved or smooth. Like the lower die, the width and depth of the projections, angle of inclination of the sidewalls, and surface configuration of the projection walls is determined by the requirements of the final products and characteristics of the material to be pressed. When positioned prior to pressing, it is important that the projections in the upper die be directly alined with the lower die depressions to obtain a symmetrical product.

This depression and projection combination in the dies serve to channelize the final panel product at regular intervals. We have therefore termed these regular combinations of depressions and projections as channels.

It is this resulting series of channels which give the panel the strength and support of conventional 2 by 4 stud-and-sheathing construction. As such, the between-channel spacing may be a standard 16 or 24 inches or varied to meet structural requirements.

The material type used is, to a certain extent, determined by the shape of the channel. Deep channels with steep sidewalls, for example, are best formed using a material with a low bulk density, such as fiber or planer shavings or a combination of material types having low bulk density such as a flake and fiber mix.

The type and amount of binder employed, additives, presstime, temperature, and mat moisture control are all matters of choice for a skilled operator within the ranges utilized for standard particle- or fiber-board manufacture.

The inventive product, after removal from the press, has assumed the die configuration, i.e., a panel having smooth, flat sections interrupted at regular intervals with channels. Between the flat sections on one side of the panel are parallel, evenly spaced projections, each of which is made up of paired sidewalls which are inclined toward one another, but which culminate in a flat bottom parallel to the flat sections previously mentioned. Accordingly, an object of this invention is a product designed to absorb loads such as wind, snow, or other forms of stress; and transfer the load directly to the ground or to other members in contact with the ground, e.g., the lower plate. This eliminates the need for framing as required by the prior art as those products absorbed loads and transmitted those loads to the frame. Also, a panel having smooth, flat sections on both sides interrupted by a plurality of parallel evenly spaced projections differs from the prior art characterized by a wavelike pattern. These structural differences determine the use to which the respective products may be put. On the opposite side of the panel is found the inverse design, i.e., parallel and evenly spaced depressions between the flat sections. These projections and depressions, in effect, form the channels mentioned and such channels give the panel strength and serve as support members. In the manufacture of standard 4- by 8-foot wall sections, for example, a plurality of evenly spaced depressions will run parallel to the 8-foot length on the outer, or sheathing side. Evenly spaced on the reverse or inner side are a plurality of correspondingly located flat-top ridgelike projections running the product's length. When the product is so used as a wall section, the panel is fitted with a top and bottom plate (normally constructed of 2- by 4-inch lumber routed out on the 4-inch face with a pattern to match the panel) along both of its 4-foot edges, and exterior siding is applied to the outer or sheathing side. Interior wall material, such as rock lath, paneling, or gypsum board is then nailed to the flat tops of the projecting support members, on the inner side, much the same as application over 2- by 4-inch studs in the more conventional mode of construction.

Accordingly, an object of the invention is a press-molded panel that combines the previous dual components of sheathing and framing support members. A further object of the invention is the provision of a readily made panel that substantially reduces material handling costs while decreasing setup or installation time at a construction site. Another object of the invention is an integral multipurpose panel product that serves as sheathing and framing for wall, roof, and flooring applications. A final objective is the provision of a panel which is simply and economically molded from residue cellulosic material to thereby aid in conserving our timber resources.

DESCRIPTION OF THE PREFERRED EMBODIMENTS

Figure 1:
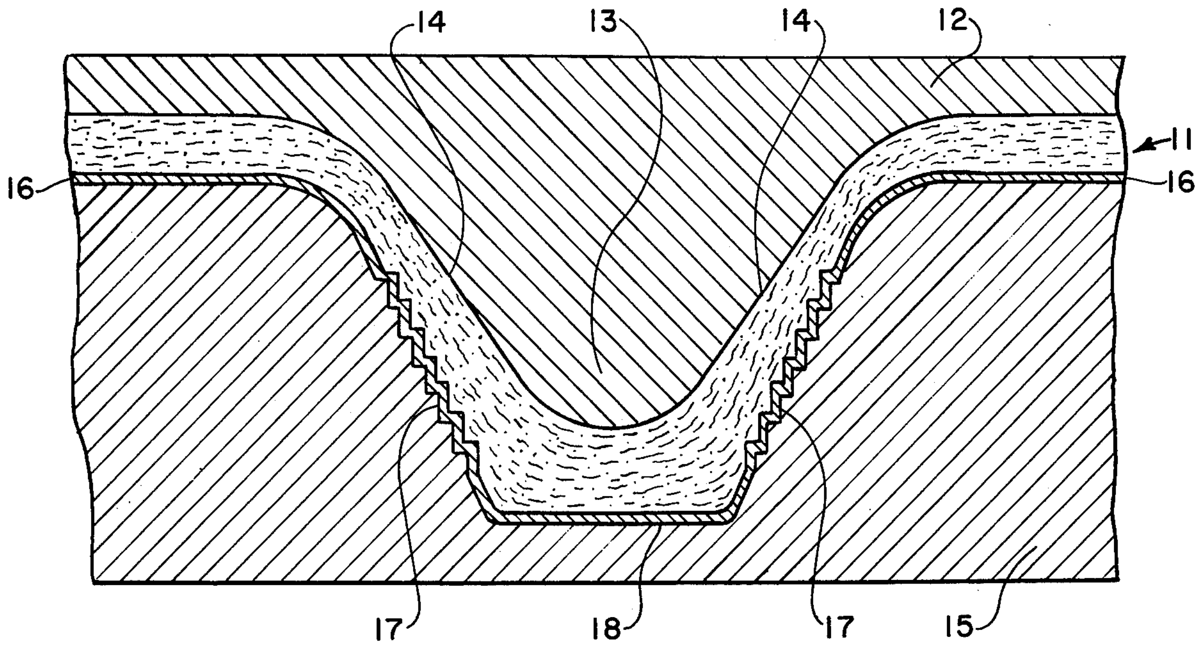
FIG. 1 is a cross-sectional view of the panel being pressed and molded by the dies.

When press-molding a panel having channels with rather steep sidewalls, selection of the raw material is somewhat critical because different die configurations may dictate necessary changes in material types. Material "flow" is essentially absent and the form is achieved, without adverse tearing of the mat or detrimental density differences within the panel, by selecting and using the proper combination of material type, die configuration, and mat preparation.

Fibrous "furnishes" having a low bulk density of from 2 to 3 pounds per cubic foot (pcf) work very well in our preferred die configuration. These are described as individual wood fibers 0.5 to 9.5 millimeters in length or groups of fibers in bundles. Panels have been made, however, from planer shavings (bulk density from 3 to 5 pcf), having thickness from 0.005 to 0.050 inch, widths of 0.1 to 1 inch and lengths from 0.5 to 3 inches. Panels have also been made from flakes or splinters, within the same dimension range as described above for planer shavings but having bulk densities from 5 to 7 pcf. The difference between planer shavings, flakes, and splinters arises from their method of preparation. Planer shavings are smooth cut and usually of varying thickness throughout the length of the shaving and tend to curve. This provides for a relatively low bulk density. Flakes are smooth cut, but have a constant thickness throughout their length. Splinters have rough surfaces and, therefore, vary in thickness throughout the length.

Because the described material does not flow when molding, the transformation of the matted material to the proper locations in the die is in part determined by the bulk density of the material. Bulk density is determined by the size and form of the particles. That material which has a low bulk density creates a thick loose mat if the proper mat configuration is created, and the dies are shaped correctly. The press upon closure will force the material into the proper locations. With low bulk density material, the adjustment in material location begins while the press is relatively far open and continues while the mat stays relatively loose. In pressing a high bulk density material the mat has only a short time and small distance to be acted on by the press forces prior to reaching final dimension and since the mat is relatively tight, resists forces to a greater degree than a low bulk density mat. The size of particle also determines the strength of the final product. The longer particles have more chance to overlap and become bonded to several other particles than short particles. Thin particles raise the compression ratio, create better bonding conditions, and result in stronger boards. Particles over 0.050 inch thick do not conform well to molding forces and give relatively lower strengths. Larger particles generally have higher bulk density properties. This is not always the case as described previously for planer shavings where because of the curl the shavings have a relatively low bulk density. In any event, the selection of proper material for the manufacture of a "no flow" molded structural member becomes a tradeoff between materials having low bulk density and low strength and those having a high strength but a high bulk density. Particle size selection will vary therefore with the die configuration and product strength requirements and may be a combination of sizes and types as described in a previous section.

The cellulosic material is prepared in a manner consistent with that employed in manufacturing regular particleboard. The material is first dried and then sprayed, coated, or mixed with a suitable adhesive binding usually a synthetic thermosetting resin, amounting to from 3 to 8 percent of the ovendry (O.D.) weight of the raw fibrous material. Suitable binders such as urea-formaldehyde, phenolformaldehyde, resorcinol, melamine, urethane, or isocyanate may be used. Other substances may be added at this stage such as waxes to improve weathering characteristics or borates to increase fire resistance.

The prepared material is then spread to form a mat on the caul plate. With a material having a low bulk density, prepressing the material in the caul plate troughs promotes a more uniform wall density.

Again, when certain raw fibrous material types are used, panel formation is aided by depositing ridges of material on the top of the mat parallel to and directly above the edges of the troughs. This provides sufficient material to obtain uniform density in the sidewalls.

The amount of the material used in mat formation is dependent on the final desired density and thickness of the panel.

Following prepressing of the felted mat, if this be desirable, the caul and mat are inserted into the lower section of the die which serves as the bottom platen of the hot press. The top platen has the shape of the top die. Referring now to the drawings, FIG. 1 shows panel 11 in a cross-sectional view during the press-molding operation. Upper die 12 has a projecting portion 13 which runs the length of the die. It is noted the sidewalls 14 of projection 13 are smooth as the inventors prefer, but they may also be stepped as sidewalls 17 of lower die 15 are. Caul plate 16, of course, has the same configuration as the surface of lower die 15. Sidewalls 17 in combination with flat bottom 18 create a trough in lower die 15. It is noted that projection 13 need not be an exact mirror image of the trough. A skilled operator may find a preference for the stepped sidewalls 17 of lower die 15 since such steps tend to hold the raw material and prevent its being pushed or slipping into the lower part of the trough during pressing. This is particularly true if the lower die has quite steeply inclined sidewalls and less so if the angle of incline is small. The trough extends the length of die 15 and it is noted that the upper and lower dies, 12 and 15 respectively, must be constructed such that the projection 13 of the upper die 12 and the trough of the lower die 15 are directly alined. Although only one projection of the upper die and one trough of the lower die are depicted, the dies in actual use would have a plurality of such alined projections and troughs. These projections and troughs form the support member sections of panel 11, and may be placed at 16-, 24-inch, or other intervals depending on the design criteria of the final use.

Returning now to the pressing operation, after insertion of the caul and mat into the press, the press is closed and the mat pressed and cured to final shape. Presstime, pressure, moisture content, and all the variables associated with mat formation and pressing are subject to the variations encountered in producing flat particleboard and as such may be altered by a skilled operator to ensure the best panel formation.

Product handling and end-use requirements will dictate actual manufacturing techniques such as press size, type, and mat felting methods. For example, when the panel is to be used as a wall section where the height of the panel (distance parallel to the channels) is essentially 8 feet, the panel might conceivably be produced on an 8-foot-wide continuoustype press wherein the channels run across the width of the press. If the panel is to become a floor or roof component, where spans greater than 8 feet are common, it may be desirable to manufacture the panel in a 4-foot-wide by 24-foot or longer press whereas the channels would run parallel to the press length.

After emergence from the press, the panel is cooled and trimmed in preparation for its use as a structural building component.

Figure 2:
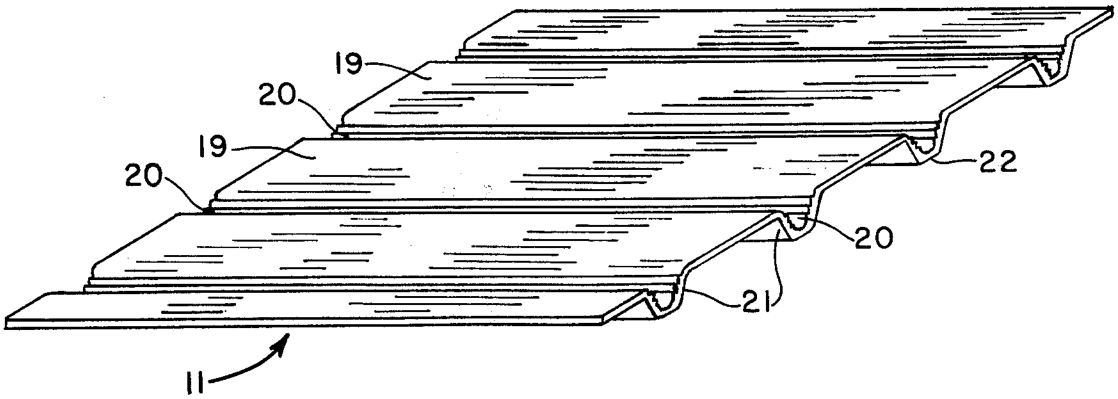
FIG. 2 is a perspective view of the panel after its emergence from the press.

Referring again to the drawings, FIG. 2 shows the invented panel 11 after removal from the press and cooling. Panel 11 has a number of flat sections 19 separated by channels 20. Channels 20 are parallel to one another and each channel is equidistant from its next adjoining channel. Each channel 20 consists of a pair of sidewalls 21 which are inclined toward one another but culminate in a flat bottom 22, which is parallel with the flat sections 19 described above. As a way of showing the alternatives available, it is noted in FIG. 2 that the surface of the sidewalls 21 are smooth on the projecting side of the channel and stepped on the depressed side. This is the reverse of that depicted in FIG. 1. The "depth" of each channel, i.e., the distance between flat section 19 and flat bottom 22, being measured perpendicular to each, is a matter of choice with the operator and would roughly correspond to the depth of the conventional support member replaced by channels 20, such as a 2 by 4 stud. For descriptive purposes, the side of panel 11 where the channels 20 project will be termed the interior side of the panel since the support members for wall and roof applications would normally be on the interior side of the frame building. The opposite side will be termed the exterior side of panel 11 because exterior materials will be applied to that side in normal building construction. The exterior side of panel 11 is depicted in FIG. 2. The shape of panel 11 further facilitates later shipment to construction sites because a plurality of panels is easily nestled together to create a high density package.

Figure 3:
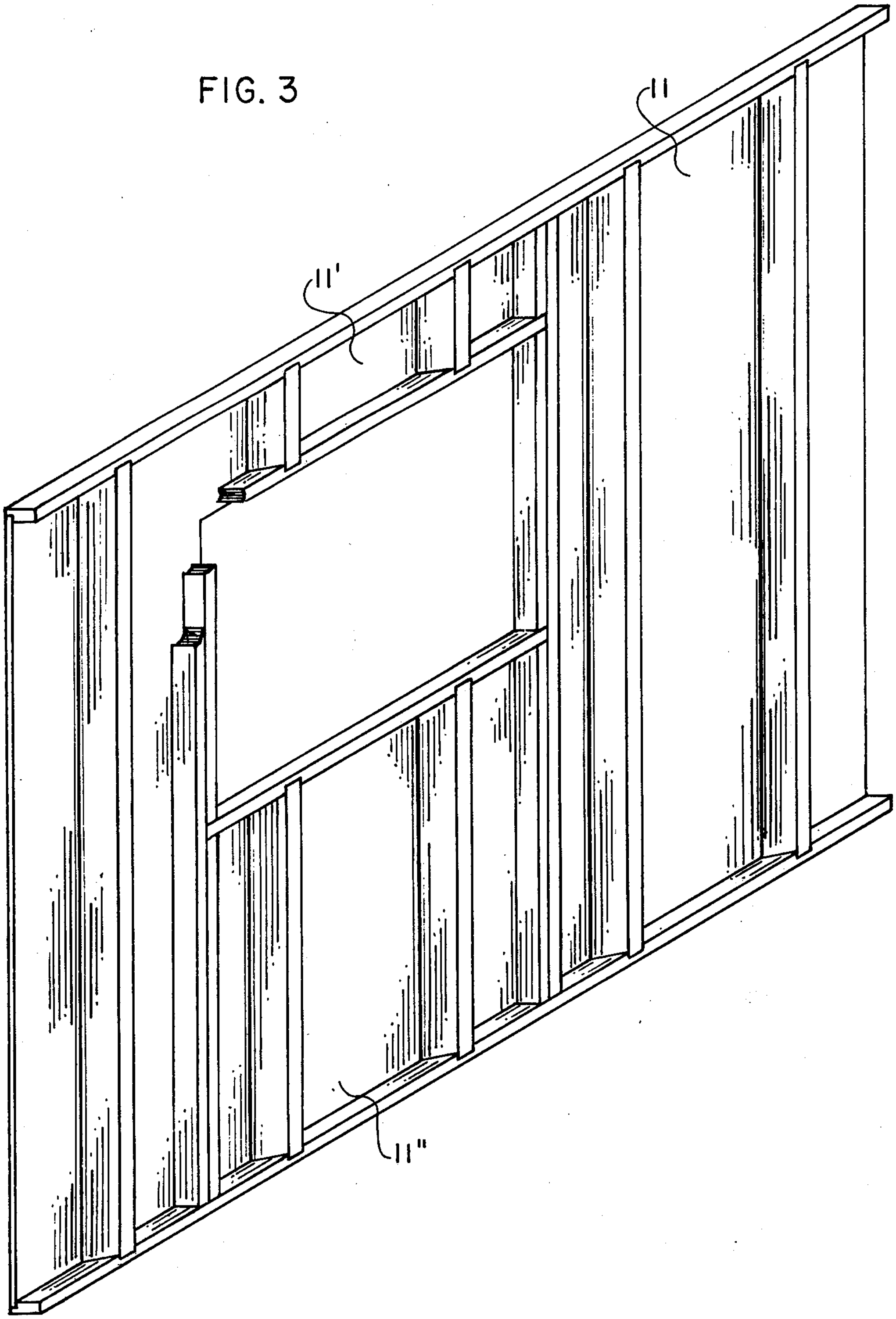
FIG. 3 is a perspective view of the panel being used as a wall section.

FIG. 3 is a more complete view of the invention utilized in forming a wall section. The wall could be formed from a single panel 11 cut out and framed to form the windows. The wall may also be built by using the invention to construct smaller individual sections, i.e., wall 11, window header 11 feet and window base 11 inches and fastening these sections together. When used as a wall, the integral support members or channels are stressed as a column in compression and the whole panel is subjected to racking-type forces. As demanded by the application, panel 11 may be constructed with increased density through the channel section to better resist the compressive force.

Figure 4:
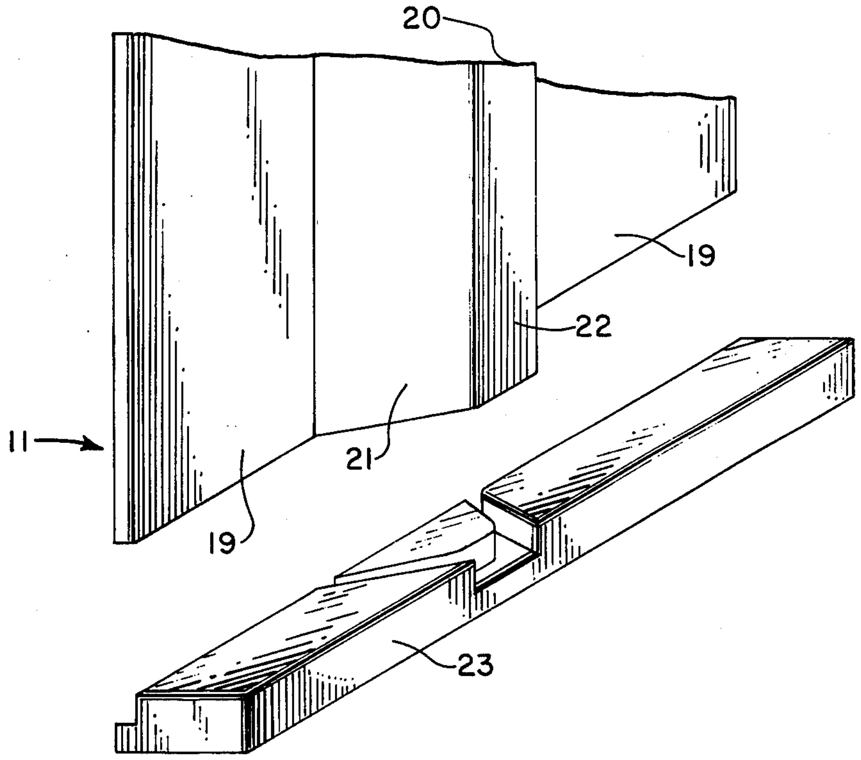
FIG. 4 is a detailed view of a portion of the panel being fitted to a plate when the panel serves as a wall section.

FIG. 4 shows plate 23 routed to fit the invention, and more specifically the flat sections 19, and the sidewalls 21, and flat bottom 22 of channel 20. Plate 23 is used in conjunction with panel 11 when wall sections are being formed. The design of plate 23 allows its use as either a top or bottom plate.

Figure 5:
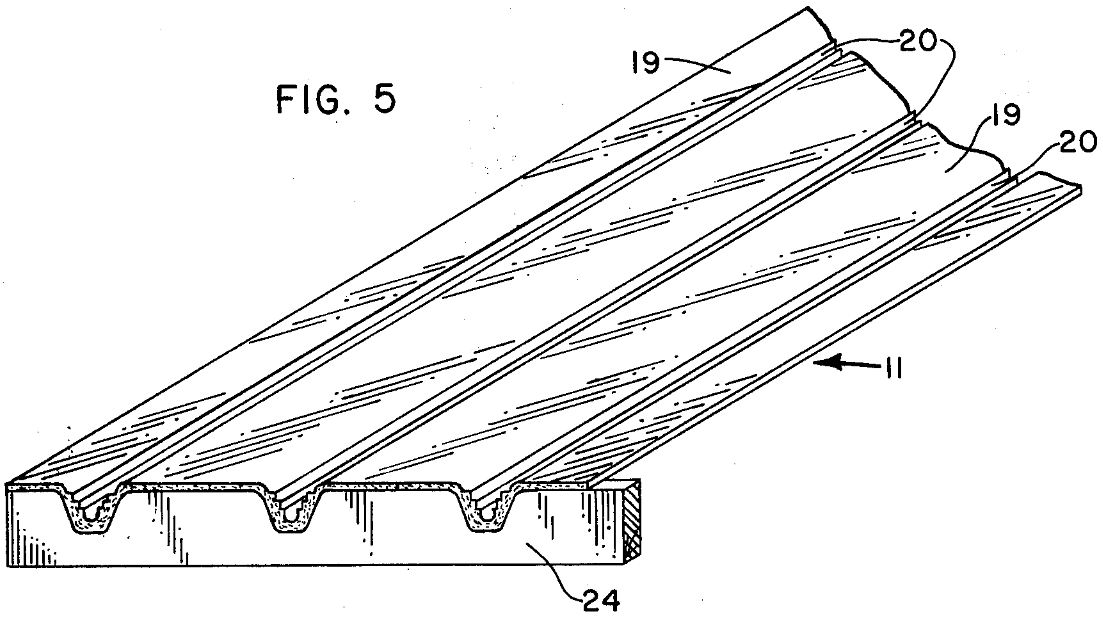
FIG. 5 is a perspective view of the panel being utilized as a floor section.

FIG. 5 shows panel 11 being used as a floor section. The channels 20 and flat sections 19 of panel 11 in effect incorporate the joists and subfloor, respectively, into a single integral unit. Channels 20 are seated in joist header 24 and underlayment (not depicted) will be applied over panel 11. Unlike the columnar stress as a wall section, when panel 11 serves as a floor section the support members or channels 20 must withstand the forces associated with a beam stressed in bending. The stiffness of the floor may be altered (and thereby its maximum design span) by changing the channel 20 design and/or increasing the stiffness of the channel 20 portion. The latter goal is accomplished by densification, use of longer flakes, and/or alining the flakes. With the process and materials used in constructing panel 11, any of the above alternatives is possible.

Having thus disclosed our invention, we claim

1. A combination sheathing-support member building product which incorporates both framing and sheathing into an integral unit for use in roof, floor, or wall applications in constructing frame buildings, said product comprising a mixture of cellulosic particles having a bulk density of from 2 to 7 pounds per cubic foot and an amount of adhesive binder of from 3 to 8 percent of the ovendried weight of said particles, said mixture being press-molded in a single operation into a panel having smooth, flat sections on its interior and exterior sides, said flat sections serving as sheathing; a plurality of parallel and evenly spaced projections between said flat sections on said interior side, each of said projections being a pair of stepped sidewalls inclined toward one another and culminating in a flat bottom which is parallel with said flat sections; a plurality of parallel and evenly spaced depressions between said flat sections on the exterior side, said depressions being directly opposite of, and aligned with, said projections on the interior side; and interior projections and exterior depressions extending an entire dimension of said panel, thus forming a plurality of channels in said panel, said channels serving as support members giving strength and support of conventional 2 by 4 stud-and-sheathing construction to the panel.

2. The product of claim 1 wherein said cellulosic particles are fibers having a bulk density of from 2 to 3 pounds per cubic foot.

3. The product of claim 1 wherein said cellulosic particles are planer shavings having a bulk density of from 3 to 5 pounds per cubic foot.

4. The product of claim 1 wherein said cellulosic particles are flakes having a bulk density of from 5 to 7 pounds per cubic foot.

* * * * *